(Model.)
H. H. DOUBLEDAY.
DRIVE CHAIN.
No. 371,929. Patented Oct. 25, 1887.
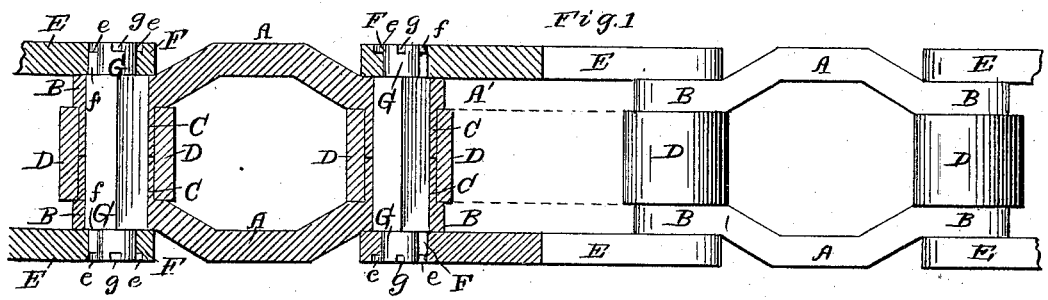
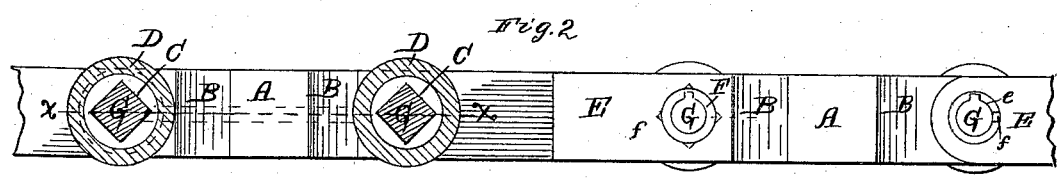
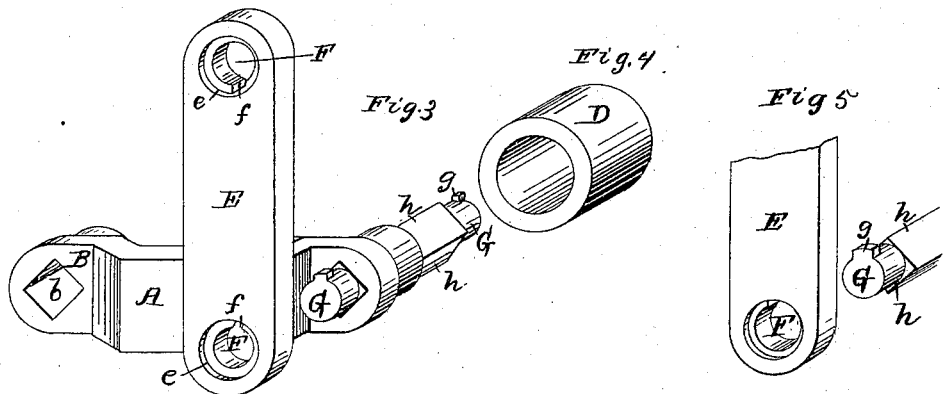
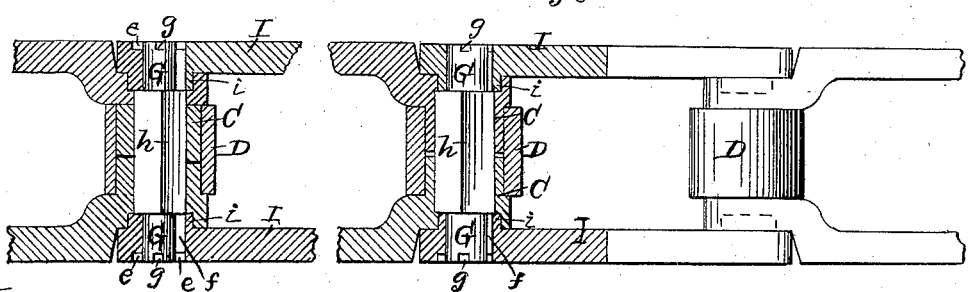
Witnesses.
E. T. Smith
J. C. Turner
Inventor:
Henry H. Doubleday

United States Patent Office.

HENRY H. DOUBLEDAY, OF WASHINGTON, DISTRICT OF COLUMBIA, ASSIGNOR TO JOSEPH A. JEFFREY, OF COLUMBUS, OHIO.

DRIVE-CHAIN.

SPECIFICATION forming part of Letters Patent No. 371,929, dated October 25, 1887.

Application filed April 19, 1884. Serial No. 128,573. (Model.)

*To all whom it may concern:*

Be it known that I, HENRY H. DOUBLEDAY, a citizen of the United States, residing at Washington, in the District of Columbia, have invented certain new and useful Improvements in Drive-Chains, of which the following is a specification, reference being had therein to the accompanying drawings.

Prior to my invention chains have been made up of links having in their opposite ends elongated holes, in combination with alternate links having at their ends projecting studs provided with transverse elongated heads or "cross-heads" adapted to pass through the elongated holes when two adjacent links are turned at right angles to each other, the relative sizes of the holes and cross-heads being such that when the links are straightened out and in working position they are incapable of separation. So, also, links have been made with studs at their ends, each stud having at its outer end a laterally-projecting spur or lug, and with, at the opposite ends of the links, seats or openings, which are elongated, expanded, or recessed upon one side to permit the passage of the studs and their laterally-projecting spurs or lugs, the relation of parts being such that the links can be coupled together when placed at right angles to each other, but are incapable of separation when straightened out into working position. So, also, chains have been made of separable side bars united by pintles having at their opposite ends substantially circular heads, the links being provided with elongated openings which are smallest near the ends of the links, where the pintles rest when the chain is straightened out, each opening being enlarged near or toward the centers of the links to permit the passage of the substantially circular heads of the pintles.

My invention differs from any of these preceding ones, in that, among other things, the pintles have at their ends lateral extensions of such character that the ends of the links which, when the chain is straightened out, are nearest to the ends of the pintles can only be passed over the ends of the pintles when the laterally-projecting extensions or spurs are turned into planes parallel with the side bars, the pintles being locked to some of the links, so as to be practically incapable of rotation relative thereto.

Figure 1 is a plan view, partly in section, on line X X, Fig. 2. Fig. 2 is an edge view, partly in section. Fig. 3 is a detached view of two links and a pintle in position for coupling. Fig. 4 is a view of the anti-friction roller. Fig. 5 is a detail. Fig. 6 is a plan view, partly in section, of a modification.

Like letters indicate like parts in all the figures.

Referring to Figs. 1 and 5, inclusive, A B B are side bars, each having, by preference, at both ends inward-projecting sleeves C C, of such length that when arranged in the chain the inner ends of the sleeves are in close proximity to each other.

D D are anti-friction rollers mounted upon the sleeves C C, which latter are, by preference, circular in cross-section upon their outer surfaces, but have openings or seats which are not circular through them. The seats, as shown in the drawings, are square in cross-section, for a purpose which will be soon explained.

E E are side bars, each having an opening, F, in each end, which opening is preferably circular in cross-section, except that upon one side it has an enlargement, throat, or notch, *f*. It will be seen that the outer pair of side bars have seats which are curvilinear in form throughout such portions thereof as are held in contact with the rounded ends of the pintles when the chain is under tension, thus forming desirable articulations when the chain is at work; but as the pintles are not intended to rotate relative to the inner part of the links, the pintle-seats in these links may be made with flat sides, which, when the chain is straightened out in working position, are adapted to engage with the corresponding portions of the pintles to prevent them from rotating. Each side bar E has a recess or countersink, *e*, around each opening F.

The pintles G are at their ends round in cross-section for such portion of their length as engages with the correspondingly-shaped seats in the side bars to facilitate a proper articulation at the joints of the chain; but those portions of the pintles which lie between the rounded ends and which engage with the inner pairs of the side bars are not round, but are made with angular corners, which project beyond the rounded portions, so as to engage with corners of the seats of said inner parts of side bars, for a purpose which will be explained. The pintles have at their opposite ends lateral projections, spurs, or lugs, of such size and form as will pass readily through the throats or enlargements $ff$ when two side bars are turned at right angles to each other, but which, when turned a quarter of the way round, so that they do not register with the notches, prevent those side bars from slipping off the ends of the pintles, thereby performing substantially the same function as is performed by the elongated heads in the chains of earlier construction, to which I have referred above. The pintles at points intermediate their heads are expanded into form other than round in cross-section, so as to project into the corners of the square seats of the side bars A B B, the object of these projections being to lock the pintles to the side bars A B B, so that they (the pintles) shall be incapable of rotation relative to these side bars.

As will be readily understood from the above description, this chain may be put together or made up in the following manner: Place two of the side bars A B B with the inner ends of their thimbles or tubular projections C C close to each other, and, when preferred, with the anti-friction rollers D D mounted on these sleeves or thimbles. Next thrust one of the pintles into its seat in the thimbles. Then place one of the side bars E upon one end of one of the pintles, the side bar E being turned at a right angle to the side bars A B B. Such side bar E may then be straightened out. There may be another side bar E mounted upon the opposite end of the same pintle by substantially the same operation or manipulation. A chain can be made up in this way if there be a sufficient looseness between the articulating parts; but in case of very close-fitting joints it may be desirable, especially when uniting the ends of the chain in forming a belt, to place two of the links formed of side bars A B B in parallel planes, and then pass both ends of one of the side bars E over the projecting ends of the pintles simultaneously, although under ordinary circumstances the chain can be made up as previously indicated.

In Fig. 6 I have shown a modification wherein the side bars are duplicates of each other. Each side bar has at the end marked I an inward-projecting boss, thimble, or sleeve, having a pintle-seat, $i$, which is round in cross-section and fitting the outer end of the pintle, except that it has upon one side a notch or throat, $f$. The opposite end of each side bar has an inward-projecting thimble or sleeve having a pintle-seat the inner part of which is angular in cross-section, while the outer part is round in cross-section, to receive the inward-projecting sleeve $i$ of the next side bar of the series. One advantage of this construction is an increased length of bearing upon each end of the pintles and the convenience arising from making the side bars duplicates of each other. In both constructions I am enabled to make a "ribbon" chain in which the pintles do not project beyond the outer faces of the side bars.

What I claim is—

1. In a drive-chain, the combination, with a series of links, of removable pintles connecting the links, and each provided at its opposite ends with laterally-projecting spurs and at a point between said spurs with angular portions adapted to engage with one or more of the links for the purpose of preventing the pintles from turning, substantially as set forth.

2. In a drive-chain, the combination, with a series of links arranged in pairs, the inner faces of each alternate pair of links resting against the outer faces of the intermediate links, of removable pintles provided at their opposite ends with laterally-projecting spurs and at points between said spurs with angular portions adapted to engage with one or more of said links for the purpose of preventing the pintles from turning, substantially as set forth.

3. In a drive-chain, the combination, with a series of links, of removable pintles connecting the links, and each provided at its opposite ends with laterally-projecting spurs and at a point between said spurs with angular portions adapted to engage with one or more of the links for the purpose of preventing the pintles from turning, the links which engage with the outer ends of the pintles having curvilinear wearing portions of its seats adapted to engage with the pintle ends when straightened out in working position, the intermediate links having seats provided with flat sides adapted to engage with the angular portions of the pintles when straightened out in working position, substantially as set forth.

In testimony whereof I affix my signature in presence of two witnesses.

HENRY H. DOUBLEDAY.

Witnesses:
C. A. NEALE,
B. W. SOMMERS.